United States Patent [19]

Chalker, Jr. et al.

[11] 4,323,771
[45] Apr. 6, 1982

[54] AUTOMATED TIME AND ATTENDANCE SYSTEM

[76] Inventors: Oliver H. Chalker, Jr., 43 Meadowood La., Old Saybrook, Conn. 06475; Robert J. Spooner, 65 Main St., Essex, Conn. 06426

[21] Appl. No.: 74,134

[22] Filed: Sep. 10, 1979

[51] Int. Cl.³ .............................................. G06K 1/00
[52] U.S. Cl. .................................. 235/377; 235/376; 235/378
[58] Field of Search ...................... 235/376, 377, 419; 340/149 A

[56] References Cited

U.S. PATENT DOCUMENTS

| | | | |
|---|---|---|---|
| 3,736,409 | 5/1973 | Boyan .................................. | 235/376 |
| 3,894,215 | 7/1975 | Lotter et al. ........................ | 235/377 |
| 4,011,434 | 3/1977 | Hockler ............................... | 235/377 |
| 4,126,779 | 11/1978 | Jowers et al. ...................... | 235/376 |

*Primary Examiner*—Harold I. Pitts
*Attorney, Agent, or Firm*—Kane, Dalsimer, Kane, Sullivan and Kurucz

[57] ABSTRACT

An automated employee time and attendance system having a central processor and a plurality of sub-systems which are capable of providing data used by the central processor in payroll determination. Each sub-system is capable of maintaining clocking information along with other employee data, adjusting such data and retrieving such data in a printed form when so desired by a timekeeper. A means is provided for allowing the monitoring of loaned and borrowed employees as between the sub-systems so that payroll determination in their regard is accurately maintained. Periodically data stored in the sub-systems are conveyed to the central processor where it sorts and merges all data received from the sub-systems including the clocking data whereby accurate payroll determination is effected.

18 Claims, 1 Drawing Figure

AUTOMATED TIME AND ATTENDANCE SYSTEM

FIELD OF THE INVENTION

The invention relates to an automatic time and attendance system for monitoring employees of a business or a Government agency.

BACKGROUND OF THE INVENTION

Effective operation of any business, corporation and/or Government agency, requires an accurate means of recording employee's attendance and hours worked so that an effective payroll system may be maintained. This, of course, is in addition to the use of such records to determine vacation schedules, efficiency and productivity studies and use in other ways in corporate management and operation.

The maintenance of such records usually involve the employee punching a time slip into a time clock upon entering and leaving the working establishment. These time slips would in turn be used by a timekeeper to determine the attendance and hours worked. While such an arrangement may be effectively utilized in a small business, in a large corporation or Government agency, i.e., such as the Post Office, the use of manual time cards involves numerous procedures for handling, which are often complex and lead to mistakes by timekeepers, aside from the time lost due to constant monitoring, auditing and management attention to insure procedures are being followed. Often times, employees are shifted on a temporary basis to understaff locations or departments and then shifted back, which is somewhat disrupting to a centralized system. In addition, monitoring and/or regulating overtime is somewhat at a disadvantage since manual record keeping is not usually capable of being maintained on an instantaneous basis.

For example, the U.S. Post Office has approximately 645,000 employees working at 31,000 installations and is subject to the Fair Labor Standards Act which requires great accuracy in attendance and time records. Recognizing the inefficiencies of the manual time cards, the Post Office is presently attempting to fully automate their system in this regard. Partial automatization has been accomplished by way of the Postal Source Data System, described in Fiscal Handbook F22 published by the U.S. Postal Service with information of some employees being fed directly into on-line data centers. The remaining employees still utilize manual time cards, with manual procedures as described in Fiscal Handbook F21 published by the U.S. Postal Service.

Their present arrangement of partial automatization has numerous shortcomings aside from the fact that the cost of automatic timekeeping functions has fallen off and now substantially less than manual. The continued use of time cards result in two-fold increase in the data requirements for payroll calculations at the data centers. As a result, there has been a substantial increase in effort required for keypunching, editing, error corrections, time card preparation and time card dispatching at the centers. This additional time and attendance processing is wasteful and usually reduces the amount of time available to produce checks and jeopardizes the ability of the data centers to make timely distribution of checks to the various installations.

Accordingly, there is exists a need for an automatic time and attendance system which is practical, efficient and reduces the clerical costs, while providing a constant monitoring of employee hours including overtime, vacation and sick leave etc. A system which will allow for monitoring loaned employee hours. A system which does not require the use of expensive interfacing between each office or installation and a central data processing center and one which will allow the timekeeper to access the time and attendance records instantly at each location for record keeping purposes while allowing the timekeeper to adjust for corrections as necessary.

SUMMARY OF THE INVENTION

Accordingly it is an object of the invention to provide for an automated time and attendance system which is practical, reliable and eliminates the time lost in manual time card handling and recording.

It is another object to provide for a system whereby the timekeeper at each office or installation is capable of accessing the time and attendance records to make corrections or obtain print-out reports of any desired information.

It is yet a further object to provide for a system which may accurately monitor loaned employees as between the various offices locations and/or departments.

A yet further object is to provide for a system which will allow for the maintenance of records and incorporation into the system of sick time, vacation time, overtime and other time categories in the system and a means for continuous updating and editing at the individual offices and/or installations.

Another object is to provide for the aforementioned without costly interfacing as between the individual offices or installations and a central data processing center while allowing said center to utilize the information from each each installation for payroll calculations and/or record keeping.

The system provides for the use of a transactor or microprocessor at each of the installations having employees. This in turn is connected to a disk data storage file to store information into the transactor. The overseer of this would be a timekeeper, who by way of a numeric key entry pad, may access the transactor to make adjustments in the employee clock rings prior to entry of clock ring data into the disk storage.

A badge reader is provided to record the daily clock rings of each employee. This is done by way of an employee's identification badge having located thereon an identification number, to which at predetermined times during the day, the employee inserts the badge into the badge reader to record the appropriate clock ring.

The timekeeper would also be able to provide daily print-outs of various information carried in the disc storage and in addition the system would provide a projected clock-out time that would inform both the employee and the supervisor the hours remaining necessary to complete a work tour.

In the case of a loaned or borrowed employee, the timekeeper at the lending installation would be able to prepare a magnetic stripe card having the employee information on it including the employee identification number i.e., social security number, time clocked-out etc. The borrowing facility would then use this magnetic stripe card information to generate an accurate file record for the borrowed employee within the installation's sub-system.

On a weekly basis, the disk data storage is then mailed or carried to the central data processing center which receives data from all of the companies' offices or installations, thereby eliminating any costly interfacing thought necessary. This central location then uses this information to maintain a master file and other records desired, including the preparation of the payroll by the sorting and merging of the data received from the all the data disk files from each installation since the loaned and borrowed employees will appear on more than one installation file.

Other objects and advantages will become apparent from the following detailed description of which is to be taken in conjunction with the accompanying drawing.

DETAILED DESCRIPTION OF THE DRAWING

Figure 1:
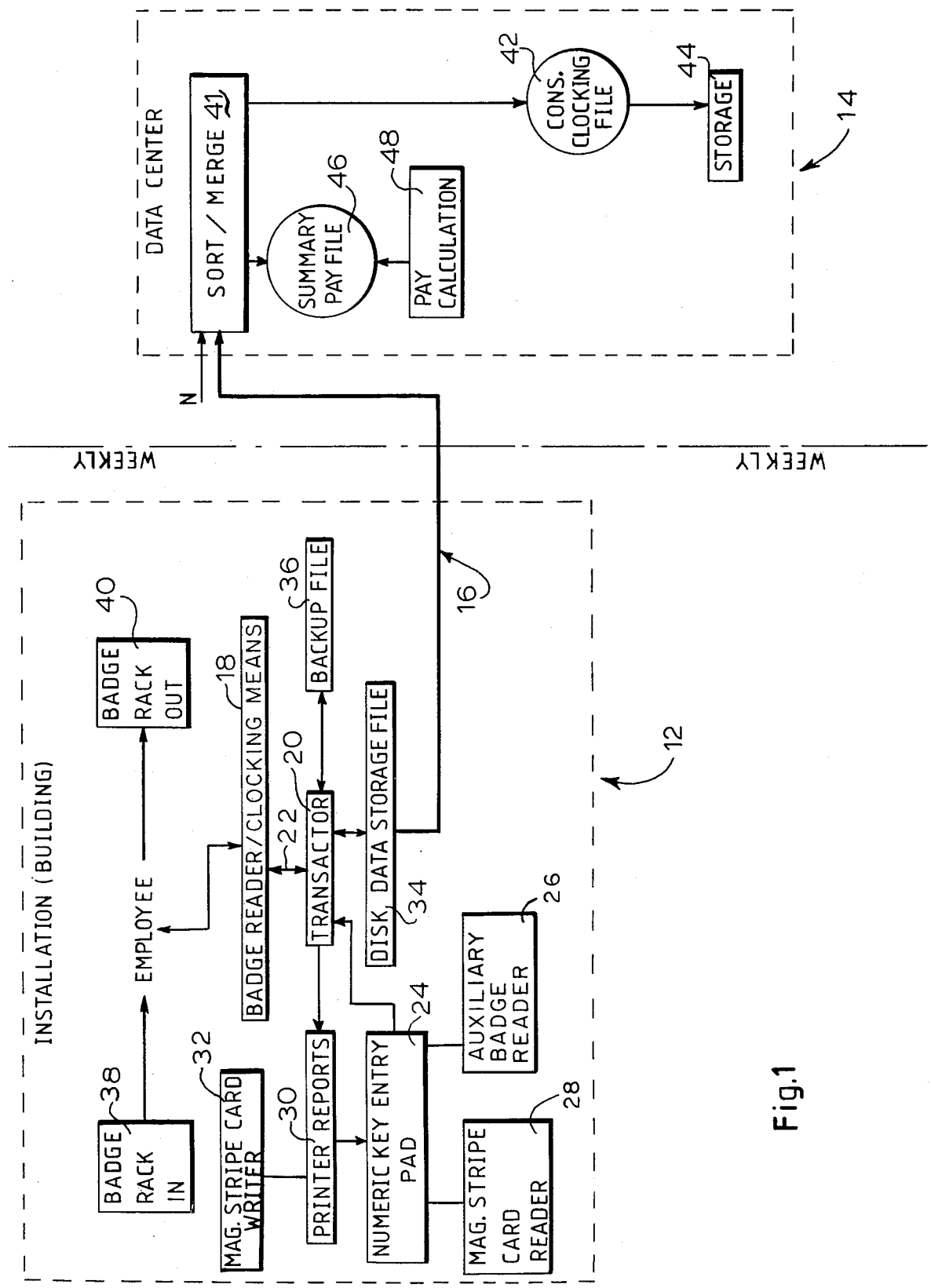
FIG. 1 is a block diagram representation of the various components of the automated time and attendance system incorporating the teachings of this invention.

The overall time and attendance system is shown in FIG. 1. Each office or installation having sufficient employees to warrant the capital outlay for such a system, would be equipped with an individual subsystem 12 per office. These subsystems, whose number would vary with the size of the operation and the number of offices or installations, i.e., as in the case of the Post Office could number approximately 31,000, would be connected to a central data processing center 14 by way of an interfacing communication means 16. However, since each office would have the ability to automate all timekeeping functions and obtain time and attendance information immediately, this would eliminate the necessity of costly interfacing, and the data from each installation may be sent to the central processor by mail or some other form, possibly on a weekly basis. This would eliminate the necessity of expensive interfacing while still providing an accurate and reliable time and attendance system.

Each employee at each of the installations would be assigned a badge containing identification information thereon. These badges may be made of a plastic material with such identification punched therein, thereby providing for a relatively permanent, not easily alterable identification means which is simple to create and requires little or no maintenance. A badge reader 1 clocking means 18 is provided to transcribe this information from each employee's badge during clock ring procedure. The badge reader may be of a conventional type such as the one manufactured by Essex Engineering Company, Essex, Conn. 06426 designated Badge Reader Terminal, Model No. S-1046. A badge reader of this type advantageously includes a ten column badge reader having a programmable read only memory, with a four digit time display, four status indicating lights i.e., ready, wait etc., a plurality of numerical entry keys which will provide a coding of the particular entry designated to the clock reading period, and a two wire differential voltage line driver/receiver. The badge reader is connected to a transactor 20 via interface 22 which may be the aforementioned two wire line which is of a relatively inexpensive nature thereby allowing a reduction in the cost of installation of said elements.

The transactor 20 is a microprocessor based terminal which receives, edits and stores badge reader transaction via the interface 22. As part of the transactor 20 or as individual units connected thereto, would be a numerical key entry pad 24, an auxiliary badge reader 26, a magnetic stripe card reader 28, a high speed printer 30, and a magnetic stripe card writer 32. If so desired, the aforementioned elements may be contained in the transactor itself possibly in a unit manufactured by Essex Engineering Co., Essex, Conn. 06426 designated as Transactor Terminal, Model SX-1047, or any other type of similar transactor may be utilized if so desired.

If separate units are desired, the auxiliary badge reader 26 may be similar to that discussed with regard to the badge reader 18. The magnetic stripe card reader 28 and writer 32 may be incorporated in a single unit, as for example, that manufactured by A.M.P. Inc., Harrisburg, Pa. designated reader/writer Model 211, or any other similar type unit. The printer 30 may be that such as provided as SCI Systems Inc., P.O. Box 4000, Huntsville, Ala. 35802, designated as rotary printer Model 1100, or any other conventional high speed printer.

The timekeeper can enter payroll exceptions and generate reports by commands entered via the numeric key entry pad 24 to the transactor. A series of software programs will allow the timekeeper to update information and request various reports. These programs may be stored by the transactor 20 and called into active memory as required by the timekeeper.

The transactor could have at least two permanent resident programs in the microprocessor memory to process employee clock rings and to validate transaction input by the timekeeper. This would assure that both the employee and the timekeeper have instant access to the system at all times.

Also, the transactor will be interfaced to, or contain therein, sufficient data storage 34 to accummulate clock ring data for at least one week and will be capable of analyzing stored data in producing printed reports by way of the high speed printer 36, on demand by the appropriate coded signal to the transactor via the numeric key entry 24. This storage may be by way of a disk storage file such as Shugart, Model SA-800 flexible disk drives, manufactured by Shugart Company, 435 Oakmead Parkway, Sunnyvale, Calif., 94086. In addition, the transactor 20 should also contain or be interfaced with a back-up file 36 which may also be of the disk data storage type as aforementioned.

Since all processing and attendance information will be completely processed within each installation, direct interfacing 16 with the data center 14 is unnecessary. Periodically, the disc data storage files containing the processed time and attendance data for each installation will be mailed or carried in some manner to the data center for its processing. If existing installations, are directly interfaced with the data center, these may be eliminated or continued as so desired.

A badge in-rack 38 and a badge out-rack 40 or some other type of receptacle for the employee's badges is provided and may be situated adjacent the badge reader 18 so as to allow easy access for an employee checking in or checking out. The employee badge will remain in these racks except during clock ringing periods at which time the timekeeper will make the badges accessible to the employees. In addition, when an employee is on loan, that employee's badge would be taken to the borrowing installation and used by that employee during the clock ringing periods thereat. The racks 38 and 40 need not be racks but may be any receptacle which conveniently allows the employee access to the badges while allowing the timekeeper to at a predetermined time, and as later discussed, prevent access to the badges by the employees. The advantage of this would become apparent during the clock ring processing hereinafter discussed.

Clock Ring Processing

As aforementioned, each employee at the installation or office be assigned a badge containing thereon identification information. An example of a sequence for a clock ring may be such that at 5 minutes before the: beginning of each tour; beginning of a meal; end of a meal; or end of a tour; the timekeeper can make the badge in-rack 38 which contains all the badges assigned to the tour, available to the employees, preferably by having it located next to the badge reader 18. Each employee will then remove his badge from the in-rack; operate one of the numerical buttons on the badge reader to indicate what clock ring period is involved: i.e., clocking in; clocking out; clocking out for a meal; clocking in after a meal; or perhaps entering a special clock ring, i.e., a carrier, delivery person or sales person who clocks out at the beginning of street time. With the appropriate button depressed, the employee would then insert his badge into the badge reader 18 which would record the time inserted along with the particular clock ring involved, and at this point the badge reader would light up signal display to inform the employee of the time of day and perhaps project the clock out time needed to work the designated tour for the date, i.e., 8 hours. If the employee has worked more than 8 hours, then the badge reader may be programmed to display only zeros. If an employee has not taken or finished a meal, the system might be programmed to assume that for the projection purposes only, that the employee will take approximately $\frac{1}{2}$ for a meal and then give the projected clock out time. After this, the badge would be placed in the badge out-rack 40, also conveniently located with respect to the badge reader.

At a predetermined time, for example, 5 minutes after the: beginning of each tour; beginning of a meal period; end of a meal period; or the end of a tour, both rack of badges can be physically removed or otherwise made inaccessible to the employees by the timekeeper. Those employees who failed to clock-in or out during the arbitrary leeway period (10 minutes, 5 minutes before plus 5 minutes after) will be required to check-in with the timekeeper for a special handling. During the special handling, the timekeeper may check with the employee's supervisor or perhaps a previously received authorization form, if so utilized, to determine what type of entry should be made via the numerical key entry pad 24 into the transactor storage.

Timekeeper Processing

Aside from this, the system can also be designed so that various types of transactions can be entered into the system including, clock ring adjustments, loan or borrowed employee situations, and appropriate premium and leave categories, i.e., night shifts, overtime etc. relating to the corresponding pay level per time period to allow the central data centers to pay each employee at the appropriate pay schedule for the job and time period worked. Of course, these are merely by way of example, and appropriate software may be programmed into the transactor so as to allow a variety of transactions to be performed by the timekeeper as desired.

In addition, the transactor may be commanded by the timekeeper to provide printed reports of various data stored in the transactor. This data might include time certification reports summarizing the time worked by each employee by perhaps a major payroll category or perhaps a certification report listing all information contained in the data storage i.e., daily clock rings, leave time, premium time etc. Transactions are entered and reports are requested throughout the transactor's numeric key entry pad 24. In addition, the transactor may include a digital display that would allow the timekeeper to visually check data being entered into the transactor before it is actually processed by the transactor. Also, numerous programs could be incorporated in the transactor to validate all data entered for accuracy before a transactor or report inquiry is accepted in the transactor.

The timekeeper will have available other sources for use in inputting information to the transactor aside from the special handling required when an employee fails to clock-in or clock-out at an appropriate time. One source is that of the supervisor or employees who will inform the timekeeper in advance of a special exception condition, such as plan to take annual leave, sick leave etc. In this regard, the timekeeper will have the ability to enter clock ring adjustments into the transactor using perhaps the employee's badge in the auxiliary badge reader 26, along with the numeric key entry pad, with the latter utilized to designate an appropriate code for the specific exempt conditions, with said code being part of the software utilized by the transactor. In this regard, missing rings may be accounted for, due to sick leave, vacation etc., and in addition, the timekeeper may enter clock rings to adjust for employee's time due to inadvertness or mistake on the part of the employee. These adjustments however, will not allow the timekeeper to alter actual clock rings entered by each employee. In addition, software may be provided to prevent employees from entering erroneous or multiple clock rings into the badge reader 18, which may be indicated by the indicating lamps on the badge reader i.e., information not accepted or rejected, and perhaps a digital readout on the badge reader indicating why the clock ring would not be accepted. In addition, once the badge is inserted into the badge reader 18, the reader will retain the card until it is determined whether the information is correct. If not correct, the timekeeper would be signaled in some manner, and informed as to the nature of the erroneous information.

Another source available to the timekeeper for inputting information, is the various inquiry or edit report produced by the system according to software program to provide desired programs, utilized in flagging error conditions for the timekeeper. These reports would be utilized by the timekeeper to correct any errors noted before the disk data storage file was sent to the central data processing.

A yet additional source for input of information by the timekeeper to the transactor includes the reports received from the installations who loan or borrow employees for temporary duties. In this regard, when an employee leaves his predetermined home installation to work in another installation or leaves the borrowing installations, a loan to check-out transaction must be processed before the employee leaves the installation. This would include the preparation of a magnetic stripe card for the employee having contained thereon the employee's identification information and whatever clock-out data is desired. The mechanics of this would be that the employee's badge would be entered into the auxiliary badge reader 26, and a magnetic stripe card would be entered into the magnetic stripe card writer 32. The transactor would then be signaled to encode onto the magnetic stripe card all of the pertinent information for that particular employee via the magnetic stripe card writer 32 so that the employee may be readily serviced by the subsystem located at the borrowing installation. The information listed on the magnetic stripe card may include the day or time checked-out, the amount of hours loaned, etc. If the lending office is an appropriate subsystem including a transactor then other information might be included which would be beneficial in providing for smooth incorporation of the loaned employee into the subsystem of the borrowing installation. All of the information entered onto the magnetic stripe card would be edited for corrections by software programmed into the transactor with possibly the various errors indicated by an error code so that the timekeeper can make the appropriate corrections.

When the employee arrives at the borrowing installation the magnetic stripe card will be utilized in entering all of the pertinent information on that employee into the master file of the borrowing installation. This may be done by way of placing the magnetic stripe card into the magnetic stripe card reader 28 with an appropriately coded signal entered on the numerical key entry pad 24 requesting that the transactor enter this information into said file. During the stay of the loaned employee at the borrowing installation, he would now be able to utilize the badge reader 18 at such installation with these clock rings being appropriately recorded in the master file.

In a case of an employee being borrowed from an installation not equipped with a subsystem, then appropriate information may be placed onto a time card which then may be utilized by the borrowing installation in conjunction with the employee's identification card may be entered into the transactor's master file by the timekeeper manually as compared to an employee borrowed from an installation having a subsystem wherein this information would be incorporated into the master file merely by way of inserting the badge and the magnetic stripe card into the respective readers of the transactor.

If an employee is being loaned to an installation not having a subsystem, then the information which is placed onto the magnetic stripe card may be placed on a print-out report signaled by the timekeeper via the numeric key entry pad 24 and this printout would be used by the borrowing office to prepare a manual time card. When an employee returns to his official duty station, a clocking-in transaction will take place whereby the employee's badge and a magnetic stripe card issued by the borrowing installation is inserted into the appropriate readers and the transactor is signaled to update the master file with the data contained thereon. If however the employee is checking-in from a non-transactor office, the timekeeper must then enter the data located on the employee manual time card prepared by the borrowing installation. This information will similarly be utilized to update the master file however through a manual input by the timekeeper rather than via the magnetic stripe card.

In a totally automated system, the use of these magnetic stripe cards along with the employee badge will allow the borrowing and loaning of employees through the system while maintaining an accurate monitoring of the attendance and time for each employee for use in maintaining a master file and consequently in payroll determination. Even in the case of a system not fully automated, the use of the employee badge and the manual time card, while subject to some clerical input, still provides an effective means of monitoring loaned and borrowed employees throughout the system. In addition, standard file maintenance procedures may be incorporated into the system by way of desired software. All data on the master file, with the exception possibly of the actual employee entered clock rings, can be added, changed or deleted by the timekeeper utilizing the employee's badge and the appropriate data entered into the numeric key pad along with a signal for the appropriate transaction to be changed, added or deleted. The transactor would include comprehensive tests performed on each transaction entered by way of appropriate software and would print a report listing a result of the transactions entered by the timekeeper via the high speed printer immediately after the transaction is entered. This would allow a printed record of the transactions along with an additional means for the timekeeper and the employee to be assured that the appropriate corrections were made.

Data Center

At the end of each pay week, all time and attendance information will be validated and summarized on the disc data storage file and the back-up file. The format for recording this might be the same as is currently used for the manual time cards, so that in this regard in a system which is partially automated, the data received by way of the disk files may readily be incorporated into central processing without the need for additional keypunching and data correction. The back-up file including a hard copy print-out of all information contained on the master file, will be retained at each installation to insure against loss of the disk storage file in transit. Prior to summation of the time and attendance information on said files, the timekeeper will correct any errors on said file which might have been detected by the various editing reports produced by the transactor pursuant to desired software programming. After any adjustments or errors are corrected, the employee disk file 34 will be mailed or otherwise sent to the data center 14 with the back-up file retained as aforementioned.

At the data center upon receipt of the disk storage file from each of the installations having a subsystem, it will sort and merge 41 data on each disk file received with N indicating the various number of subsystems capable of being incorporated into the system. In addition, it will sort and merge information received from the installations not having a subsystem, if any, which is required since time and attendance information is available from more than one installation due to the loaning and borrowing of employees. Of course the data center would include sufficient hardware to provide for such sorting and merging of data and in addition, would capable of consolidating an employee master detail file 42 for each employee, which would include all of clocking-in and out data, which would be retained in storage 44 if needed for future reference.

In addition, the data center would be provided with a computer system, of a somewhat conventional nature, which is capable of analyzing and summarizing the information included on the employee master file which is contained on a disk data storage from each of the installations and generate a summary pay file 46 which would then be used to determine payroll calculations 48.

In this manner, the time and attendance system described herein would allow for effective automation of such a system in a business, corporation or Government agency such as the Post Office. While the Post Office has been used as an example herein on numerous occasions, the system provided is in no sense limited to the Post Office, and may be utilized in other Government agencies and corporations and businesses. In addition, it is not necessary that each installation be physically removed from other installations for the system to be effective, since such a system may be incorporated even within the various departments in the same business, corporation or agency.

While a somewhat preferred embodiment of the present invention has been disclosed and described in detail herein, it should be understood that its scope should not be limited thereby and should be determined by that of the appended claims.

What is claimed is:

1. An employee time and attendance system having a central processor and a plurality of subsystems each capable of generating data in a form utilizable by the central processor, wherein at least one subsystem comprises: an identification means for each of a plurality of employees which includes identifying employee data particular for each employee; a transactor; a clocking means connected to said transactor and capable of providing clocking-in and clocking-out of employees and a corresponding clocking data output; said clocking means is adapted to receive said identification means and convey the employee data along with the clocking data to the transactor; a data storage means connected to the transactor and capable of storing clocking and employee data for a plurality of employees; and an input means connected to the transactor capable of supplying data thereto, adjusting data received by the transactor and recalling data from the data storage means.

2. The system in accordance with claim 1 wherein the identification means includes an individual badge for each employee and said clocking means includes a badge reader adapted to convey identifying data from said badge in conjunction with the clocking data to the transactor so that the clocking data is stored for the particular employee.

3. The system in accordance with claims 1 or 2 wherein the clocking data includes predetermined clocking periods and the badge reader is adapted to identify the predetermined clocking periods and convey the period identified to the transactor along with the employee data.

4. The system in accordance with claim 3 wherein the badge reader further includes a means of identifying the clocking-in or out of an employee outside of the predetermined clocking period.

5. The system in accordance with claim 1 wherein said storage means is of the disk type and is of sufficient size to store amount of data received by said transactor.

6. The system in accordance with claim 5 which includes a second storage means connected to said transactor which is capable of storing data duplicate to that stored in the first storage means.

7. The system in accordance with claims 5 or 6 wherein said storage means include flexible disk drives.

8. The system in accordance with claim 5 which includes a means of conveying the data stored by said storage means to the central processor on a periodic basis.

9. The system in accordance with claim 1 wherein said input means includes a numeric key entry pad adapted to input, adjust and request data in said transactor.

10. The system in accordance with claim 1 which further includes a printer connected to the transactor, said printer being responsive to a request for data from the input means and capable of printing the data output from the transactor.

11. The system in accordance with claim 2 which includes a second badge reader adapted to be used with the input means so that the employee badge may be utilized when inputting, adjusting or requesting data in the transactor.

12. The system in accordance with claim 1 further including a magnetic stripe card writer connected to the transactor wherein the input means is capable of generating an output of data from the transactor with said output of data being placed on a magnetic stripe card by said writer.

13. The system in accordance with claim 1 wherein said input means include the magnetic stripe card reader which is adapted to convey the information contained upon a magnetic stripe card to said transactor.

14. The system in accordance with claim 12 or 13 further including a magnetic stripe card which is adapted to receive employee information thereon, with said card being used when employees are loaned or borrowed between different sub-systems to incorporate employee information in the sub-systems borrowing and loaning the employee.

15. The system in accordance with claim 1 wherein the transactor includes a memory having sufficient capacity to allow for software programming thereof to perform predetermined editing of data and control functions of the sub-system.

16. The system in accordance with claim 5 wherein the central processor includes a means for sorting and merging all data received from the sub-systems and eliminating any duplicity in clocking data due to the loaning and borrowing of employees between the sub-systems, and said central processor is capable of compiling an output which may be used in payroll determination.

17. The system in accordance with claim 5 wherein said central processor includes a means for utilizing data in conventional time card form in conjunction with the disk type data in payroll determination.

18. The system in accordance with claim 8 wherein the central processor includes a means for compiling a file for each employee's clocking data and means for storing said clocking data.

* * * * *

UNITED STATES PATENT AND TRADEMARK OFFICE
CERTIFICATE OF CORRECTION

PATENT NO.   :   4,323,771
DATED        :   April 6, 1982
INVENTOR(S)  :   Oliver H. Chalker, Jr.

It is certified that error appears in the above—identified patent and that said Letters Patent is hereby corrected as shown below:

Column 1, line 65, delete "is";
Column 2, line 35, delete "each" (1st occurrance);

Signed and Sealed this

Seventeenth Day of August 1982

[SEAL]

Attest:

GERALD J. MOSSINGHOFF

Attesting Officer     Commissioner of Patents and Trademarks